United States Patent
James et al.

(10) Patent No.: US 7,595,131 B2
(45) Date of Patent: Sep. 29, 2009

(54) CONNECTION BETWEEN A CONDUCTIVE SUBSTRATE AND A LAMINATE

(75) Inventors: David Albert James, Mount Waverley (AU); Richard Michael Stephens, Lower Plenty (AU); Alina Kay Sloan, Port Melbourne (AU)

(73) Assignee: Cap-XX Limited, Dee Why, NSW (AU)

( * ) Notice: Subject to any disclaimer, the term of this patent is extended or adjusted under 35 U.S.C. 154(b) by 842 days.

(21) Appl. No.: 10/433,860

(22) PCT Filed: Dec. 10, 2001

(86) PCT No.: PCT/AU01/01590

§ 371 (c)(1),
(2), (4) Date: Nov. 12, 2003

(87) PCT Pub. No.: WO02/47099

PCT Pub. Date: Jun. 13, 2002

(65) Prior Publication Data

US 2004/0076877 A1    Apr. 22, 2004

(30) Foreign Application Priority Data

Dec. 9, 2000    (AU) .................... PR1994

(51) Int. Cl.
*H01M 2/30*    (2006.01)
(52) U.S. Cl. .................. 429/181; 429/170; 429/162
(58) Field of Classification Search .......... 129/162, 129/185; 429/170, 181; 29/623.5
See application file for complete search history.

(56) References Cited

U.S. PATENT DOCUMENTS

| | | | | |
|---|---|---|---|---|
| 4,059,718 A | | 11/1977 | Messing | 429/162 |
| 4,923,769 A | | 5/1990 | Jones et al. | 429/101 |
| 5,948,562 A | * | 9/1999 | Fulcher et al. | 429/181 |
| 6,145,280 A | * | 11/2000 | Daroux et al. | 53/433 |
| 6,277,516 B1 | * | 8/2001 | Sasaki et al. | 429/162 |
| 6,660,429 B2 | * | 12/2003 | O'Connell | 429/184 |
| 6,844,109 B2 | * | 1/2005 | Xing et al. | 429/129 |
| 7,008,720 B2 | * | 3/2006 | Shimamura et al. | 429/179 |
| 7,125,627 B2 | * | 10/2006 | Gu | 429/62 |

FOREIGN PATENT DOCUMENTS

| | | |
|---|---|---|
| EP | 0975031 A1 | 1/2000 |
| JP | 59103280 | 6/1984 |
| JP | 2000-156242 A | 6/2000 |
| WO | WO99/36971 | 7/1999 |
| WO | WO01/57941 | 8/2001 |

OTHER PUBLICATIONS

DuPont Product Webpage for Nucrel, 2006.*

* cited by examiner

*Primary Examiner*—Mark Ruthkosky
(74) *Attorney, Agent, or Firm*—Kenyon & Kenyon LLP

(57) ABSTRACT

A connection (1) is provided between a conductive substrate, in the form of a planar aluminium terminal (2), and a laminate (3). The laminate has a first plastics layer, in the form of a polymer layer (4), that is secured to terminal (2) and a conductive aluminium layer (5) disposed outwardly from and adjacent to layer (4). The layers (4, 5) terminate at a common circular edge (6) that defines an opening (7) that overlies terminal (2). The connection (1) includes an insulator in the form of a grommet (8) that extends over edge (6) for electrically insulating layer (5) from terminal (2).

20 Claims, 7 Drawing Sheets (a)

(b)

CONNECTION BETWEEN A CONDUCTIVE SUBSTRATE AND A LAMINATE

FIELD OF THE INVENTION

The present invention relates to a connection and in particular to a connection between a conductive substrate and a laminate.

The invention has been developed primarily for connecting together a metal terminal and a laminated housing of an energy storage device—such as a supercapacitor—and will be described hereinafter with reference to that application. However, it will be appreciated that the invention is not limited to this particular field of use and is also applicable to other energy storage devices such as batteries, capacitors, fuel cells and the like, as well as to other devices that require a seal or other connection between a metal and a composite laminar material.

DISCUSSION OF THE PRIOR ART

Recently, energy storage devices such as batteries and, in some case supercapacitors, have made use of flexible packaging. While such packaging offers considerable advantages over conventional hard cases, it also suffers from many downsides. As a skilled addressee will appreciate, the function of the packaging is to both prevent the leakage of the often corrosive electrolyte to the environment and, even more importantly, to prevent the ingress of environmental contaminants into the packaging. That is, even extremely small amounts of contaminants can have a drastic effect upon the performance of the device.

In an attempt to address these issues, use has been made of a laminar packaging that includes a barrier layer of metal. This packaging is formed from two of the laminate sheets that sandwich an energy storage cell, where those sheets are abutted and heat sealed about their peripheries. While this generally offers extremely good resistance to the passage of fluids through the sheets, it does not provide any assistance to the main area of leakage, that which occurs about the terminals of the device. That is, to allow connection of the device to external circuitry it is necessary to have terminals that extend from a first end within the housing to a second end outside the housing. With the above approach, this requires that the terminals extend out from between the sheets. This, in turn, requires the bonding of a conductive material, which in this case is the aluminium terminal, to a non-conductive material, which in this case is the innermost layer of the packaging.

In some cases an adhesive and/or a filler is pre-applied to the peripheries of the sheets to occupy any cavities that may be otherwise formed between the adjacent peripheries once they are laid over the terminals. Heat is then applied to the sheets adjacent to their peripheries to cause those faces to heat seal to each other and to the terminals. This process is extremely sensitive to:
1. The positioning of the edges and the terminals;
2. The thickness of the terminals and therefore the need to sharply bend the opposed peripheries of the sheets about the edges of the terminals to bring those peripheries into contact with each other as close to the edges as possible; and
3. The quantity and quality of the adhesive and/or filler.

These factors make it particularly difficult to produce packaging of consistent quality and performance. Further, these factors provide considerable barriers to the automated manufacture of the packaging.

Any discussion of the prior art throughout the specification should in no way be considered as an admission that such prior art is widely known or forms part of common general knowledge in the field.

BRIEF DESCRIPTION OF THE INVENTION

It is an object of the present invention, at least in the preferred embodiments, to overcome or substantially ameliorate one or more of the disadvantages of the prior art.

According to a first aspect of the invention there is provided a connection between a conductive substrate and a laminate, the laminate having:
a first plastics layer that is secured to the substrate; and
a conductive layer disposed adjacent to the first layer and being spaced apart from the substrate;
wherein the layers terminate at a common edge that overlies the substrate and the connection includes an insulator that extends over the edge for electrically insulating the conductive layer from the substrate.

Preferably, the common edge is defined by the periphery of an opening that extends through the layers. More preferably, the laminate includes a second plastics layer and a third plastic layer that sandwich the conductive layer, wherein the third plastics layer is intermediate the conductive layer and the first layer.

Preferably, the laminate includes a fourth plastics layer that is disposed between the first plastics layer and the third plastics layer.

Preferably also, the insulator is a grommet that is integrally formed from one or both of the first and fourth layers. Even more preferably, the grommet is integrally formed from the fourth layer.

In other embodiments the common edge is a portion of a straight edge of the laminate that passes over the substrate.

Preferably also, all the layers in the laminate are coextensive and coterminous.

In a preferred form, the first, second, third, fourth and conductive layers respectively include a low melting point polymer with adhesive properties, PET, PET, polyethylene and aluminium. More preferably, the thickness of the fourth layer is greater than or equal to the combined thickness of the second, third and conductive layers.

Preferably, the first layer the polymer that is sold under the trademark Nucrel.

Preferably also, all the common edge overlies the substrate. In other embodiments, however, only part of the common edge overlies the substrate.

According to a second aspect of the invention there is provided an energy storage device including:
a laminate housing having an inner plastics layer and a conductive layer disposed externally to the inner layer, wherein the layers terminate at a common edge;
an energy storage cell disposed within the housing;
two terminals extending from the cell and being accessible from outside the housing for allowing external electrical connection to the cell, wherein at least one of the terminals is secured to the first layer at or adjacent to the common edge; and
an insulator that extends over the edge for electrically insulating the conductive layer from the at least one terminal.

According to a third aspect of the invention there is provided a method for providing a connection between a conductive substrate and a laminate, the method including the steps of:
securing a first plastics layer of the laminate to the substrate;

disposing a conductive layer of the laminate adjacent to the first layer and spaced apart from the substrate;

terminating the layers terminate at a common edge that overlies the substrate;

electrically insulating the conductive layer from the substrate with an insulator that extends over the edge.

According to a fourth aspect of the invention there is provided a method of manufacturing an energy storage device, the method including the steps of:

providing a laminate housing having an inner plastics layer and a conductive layer disposed externally to the inner layer, wherein the layers terminate at a common edge;

disposing an energy storage cell within the housing;

allowing external electrical connection to the cell with two terminals that extend from the cell and that are accessible from outside the housing, wherein at least one of the terminals is secured to the first layer at or adjacent to the common edge; and electrically insulating the conductive layer from the at least one terminal with an insulator that extends over the edge.

According to a fifth aspect of the invention there is provided an energy storage device including:

at least one energy storage cell;

a housing having an inner plastics layer for abutting the cell, an outer plastics layer extending across the inner layer, and a barrier layer extending intermediate the inner and outer layers;

two spaced apart openings in the housing which extend through the layers;

two terminals that extend from the cell and cover respective openings for allowing external electrical connection to the cell; and a grommet that extends about the opening for electrically insulating the terminals from the barrier layer.

According to a sixth aspect of the invention there is provided a terminal for an energy storage device, the terminal including:

a conductive contact surface;

a first plastics layer for abutting and sealingly engaging the surface;

a barrier layer exterior to the plastics layer;

a second plastics layer exterior to the barrier layer;

an opening through the layers for allowing electrical access to the surface; and a grommet that extends about the opening for electrically insulating the contact surface from the barrier layer.

According to a seventh aspect of the invention there is provided a method of manufacturing an energy storage device including:

at least one energy storage cell;

a housing having an inner plastics layer for abutting the cell, an outer plastics layer extending across the inner layer, and a barrier layer extending intermediate the inner and outer layers;

two spaced apart openings in the housing which extend through the layers;

two terminals that extend from the cell and cover respective openings for allowing external electrical connection to the cell; and a grommet that extends about the opening for electrically insulating the terminals from the barrier layer.

According to an eighth aspect of the invention there is provided a method of manufacturing a terminal for an energy storage device, the terminal including:

providing a conductive contact surface;

abutting and sealingly engaging a first plastics layer with the surface;

providing a barrier layer exterior to the plastics layer;

providing a second plastics layer exterior to the barrier layer; allowing electrical access to the surface via an opening through the layers; and electrically insulating the contact surface from the barrier layer with a grommet that extends about the opening.

According to a ninth aspect of the invention there is provided an energy storage device including:

an energy storage cell;

a housing for containing the cell, the housing having two abutted portions that are sealed together, wherein the abutted portions are of substantially uniform collective thickness; and two terminals connected to the cell for allowing external electrical connection with the cell.

Preferably, the housing includes two openings that are covered by the respective terminals and two sealing portions that surround and are adjacent to the openings. More preferably, the terminals are planar and the sealing portions overlie and are sealingly engaged with the terminals. More preferably, that sealing engagement is effected by heat.

According to a tenth aspect of the invention there is provided an energy storage device including:

an energy storage cell;

two terminals connected to the cell for allowing external electrical connection with the cell, each terminal having at least one substantially planar surface;

a housing for containing the cell and some of the terminals, the housing being sealingly abutted with the surfaces.

Preferably, the housing includes a first plastics layer adjacent to the terminals, an outer plastics layer that extends over the first layer, and a barrier layer that extends intermediate the first and the outer layers. More preferably, the opening extends through all the layers and the housing includes a grommet that extends about the opening for electrically isolating the intermediate layer from the terminal.

According to an eleventh aspect of the invention there is provided a connection between a conductive substrate and a laminate having a first plastics layer that is secured to the substrate and a barrier layer disposed adjacent to the first layer and being spaced apart from the substrate, wherein the layers terminate at a common edge that overlies the substrate and the connection includes an insulator that extends over the edge for electrically insulating the barrier layer from the substrate.

Preferably, the barrier layer is conductive.

Preferably also, the laminate includes a second plastics layer that is disposed on the opposite side of the metal layer to the first plastics layer wherein the melting point of the second layer is less than the melting point of the first layer. More preferably, the melting point of the second layer is at least 30° C. less than the melting point of the first layer. Even more preferably, the melting point of the second layer is at least 50° C. less than the melting point of the first layer.

According to a twelfth aspect of the invention there is provided a method of providing a connection between a conductive substrate and a laminate having a first plastics layer, a second plastics layer and a barrier layer that is disposed intermediate the first and the second layers, the layers having a common edge and the method including:

abutting the first layer against the substrate such that the substrate extends beyond the common edge; and heating the laminate to preferentially soften the second layer such that that layer forms an insulating barrier between the metal layer and the substrate.

Preferably, the first layer includes a first melting point and the second layer includes a second melting point that is less than the first melting point. More preferably, the second melting point is at least 30° C. less than the first melting point.

Even more preferably, the second melting point is at least 50° C. less than the first melting point. In other embodiments, however, use is made of localized heating to achieve the preferential softening of the second layer.

Preferably also, the heating is accompanied by simultaneous compression of the laminate with the substrate.

In a preferred form, the common edge is inclined away from the laminate such that the first layer is convex adjacent to the edge.

BRIEF DESCRIPTION OF THE DRAWINGS

Preferred embodiments of the invention will now be described, by way of example only, with reference to the accompanying drawings. All the drawings are schematic and are not necessarily to the correct scale or proportion. Particularly.

DETAILED DESCRIPTION OF PREFERRED EMBODIMENTS

Figure 1:
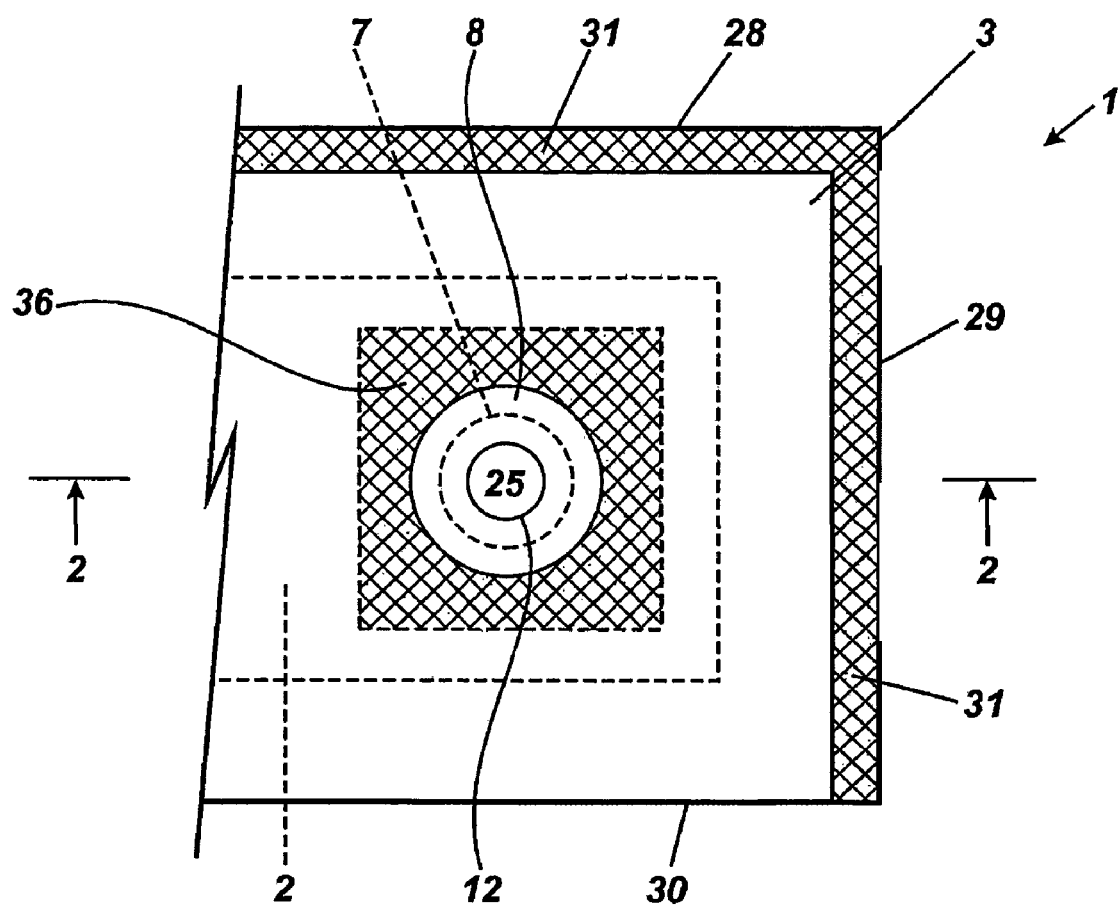
FIG. 1 is a plan view of a connection according to the first aspect of the invention.
Figure 2:
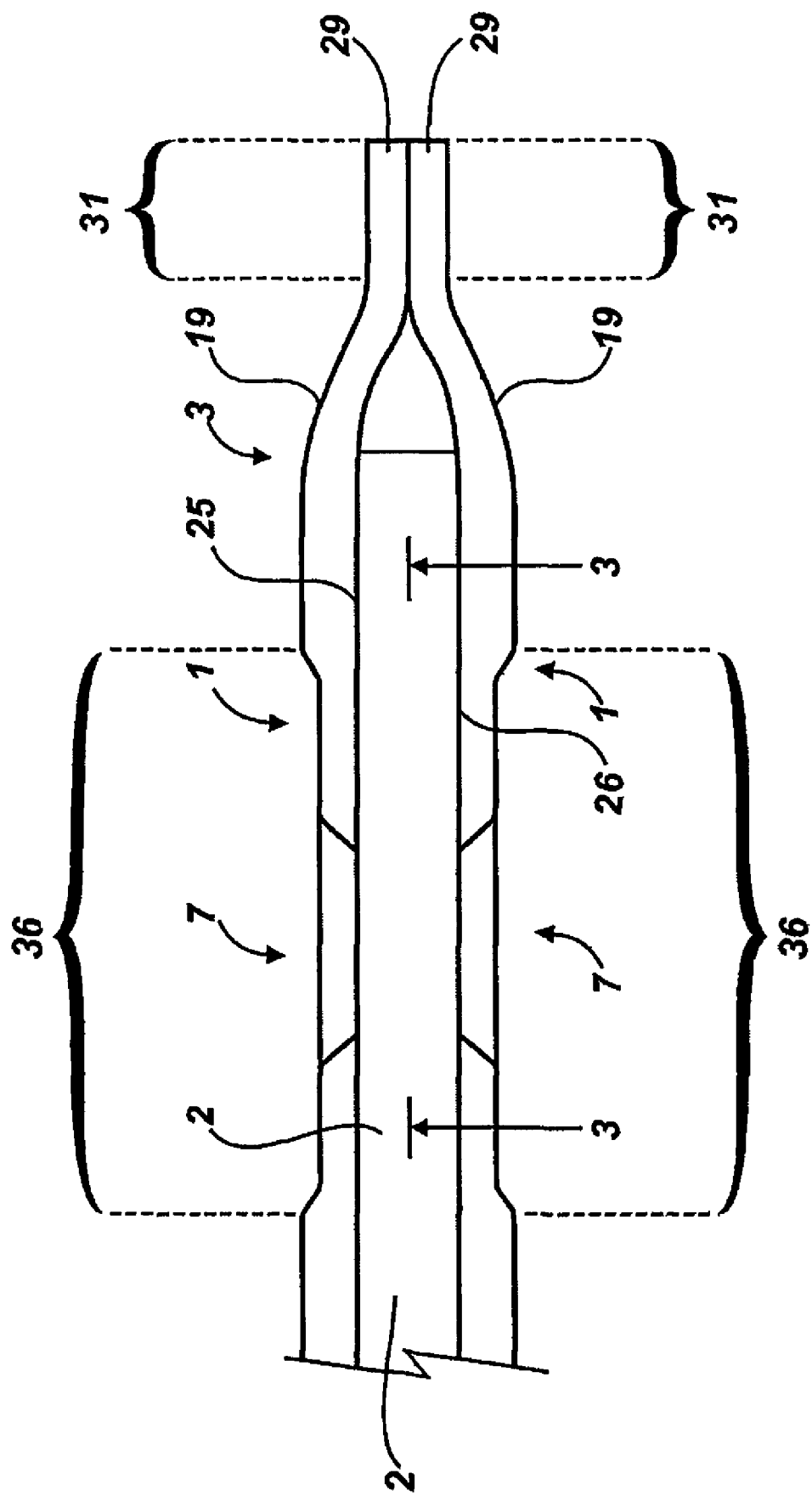
FIG. 2 is a cross sectional view taken along line 2-2 of FIG. 1.
Figure 3:
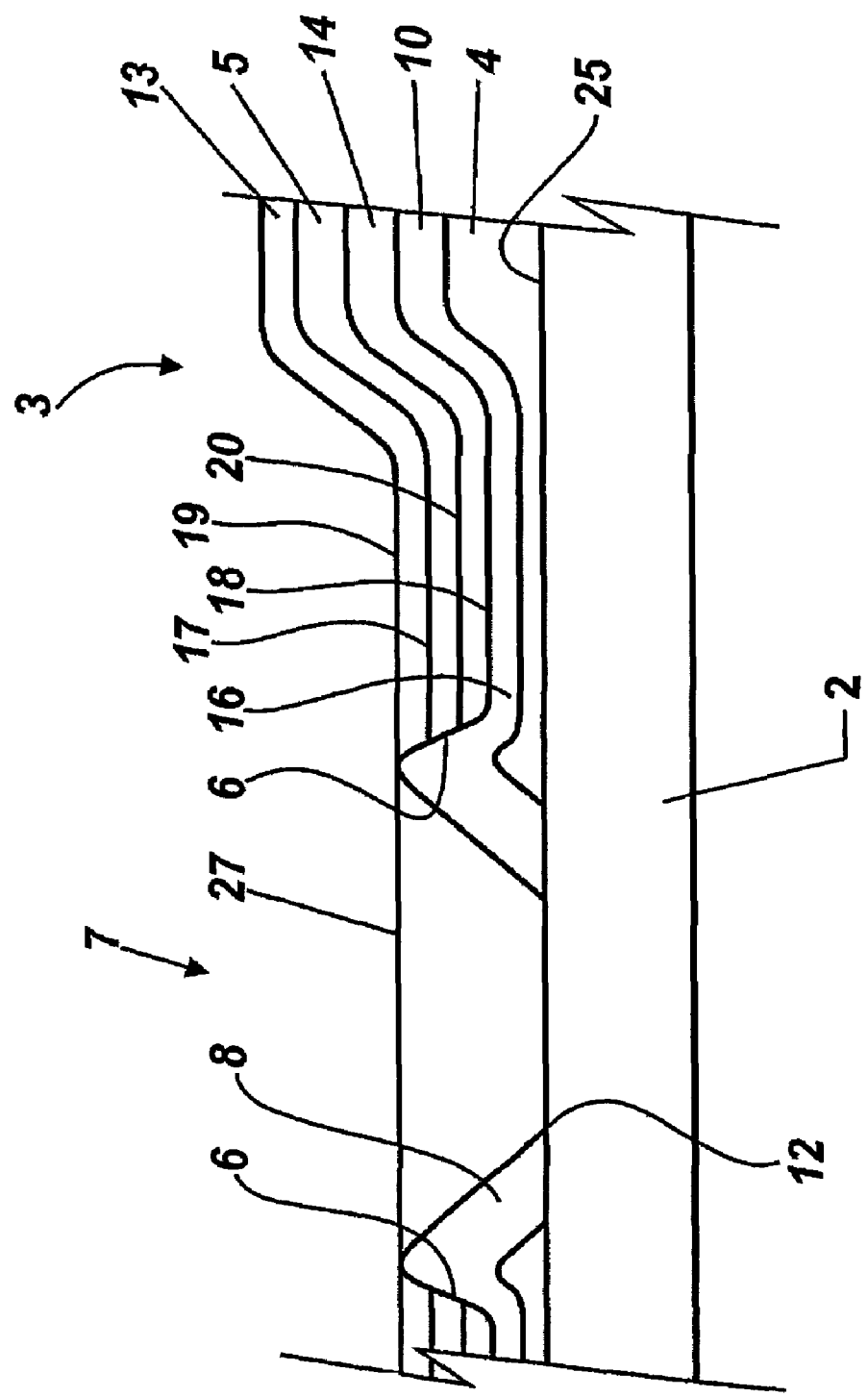
FIG. 3 is an enlarged cross sectional view taken along line 3-3 of FIG. 2.

Referring to FIGS. 1, 2 and 3, there is shown a connection 1 between a conductive substrate, in the form of a planar aluminium terminal 2, and a laminate 3. The laminate has a first plastics layer, in the form of a polymer layer 4, that is secured to terminal 2 and a conductive aluminium layer 5 disposed outwardly from and adjacent to layer 4. The layers 4 and 5 terminate at a common circular edge 6 that defines an opening 7 that overlies terminal 2. The connection 1 includes an insulator in the form of a grommet 8 that extends over edge 6 for electrically insulating layer 5 from terminal 2.

Laminate 3 also includes a second plastics layer in the form of polyethylene layer 10 that is coextensive with and disposed intermediate layers 4 and 5. As best shown in FIG. 3, grommet 8 is integrally formed with layers 4 and 10 and extends radially inwardly beyond edge 6 and into opening 7. The innermost radial extent of grommet 8 will be referred to as edge 12. The formation of grommet 8 will be described in more detail below.

Opening 7 is about 4 mm in diameter. In other embodiments different diameters are utilized. Moreover, alternative embodiments make use of non-circular openings.

Laminate 3 also includes an outer PET layer 13 that, together with layer 4, sandwiches layer 5. Moreover, laminate 3 includes a third plastics layer in the form of a PET layer 14 that is disposed intermediate layers 5 and 10. The function of these layers will be described in more detail below.

In this embodiment, layers 4, 5, 10, 13 and 14 are coextensive and include respective outer surfaces 16, 17, 18, 19 and 20. Of these, surfaces 16, 17, 18 and 20 are bonded or otherwise secured to respective inner surfaces of the adjacent layer.

The formation of grommet 8 occurs through the application of heat and pressure to both surface 19 and to terminal 2. In other embodiments, however, the heat is applied to only surface 19. The forming operation will be described in more detail below.

It will be appreciated that in other embodiments grommet 8 is integrally formed with only one of layers 4 and 10. In further embodiments grommet 8 is integrally formed also with layers 13 and 14. In these latter cases the constitution of the layers or the application of heat needs to be such as to ensure the preferential softening and flow of the respective layers to form the grommet.

In still further embodiments, grommet 8 is integrally formed with all of layers 4, 10, 13 and 14.

Layer 4, in this embodiment, is that polymer sold under the trademark Nucrel. In other embodiments alternative polymers are used such as that sold under the trademark Surlyn.

Terminal 2 is a solid rectangular prism that includes an upper planar surface 25 and a lower planar surface 26. As best shown in FIG. 2, terminal 2 is the site of two like but mirror image connections 1, one being associated with each of surfaces 25 and 26. These connections have like features denoted by like reference numerals.

Referring to FIG. 3, the generally annular grommet 8 extends axially from surface 25, through opening 7 and terminates in an outer edge 27. The edge 27 protrudes axially beyond opening 7, in that edge 27 extends past surface 19. This ensures that grommet 8 covers all of edge 6 to provide a physical barrier to electrical contact between layer 5 and terminal 2. In other embodiments edge 27 does not extend axially to cover all of edge 6, although still sufficiently to extend axially to surface 17. That is, the grommet, while being smaller, still covers edge 6 of layer 5 to prevent any inadvertent shorting between layer 5 and terminal 2.

Laminate 3 is a folded sheet that is heat sealed about its periphery to sealingly contain an energy storage cell (not shown). An energy storage cell, and the resultant energy storage device that is defined by the cell and the housing is described in Australian provisional patent application PR1944 file on Dec. 6, 2000 and the subsequently PCT application that claims priority from that provisional application and which was filed on Dec. 6, 2001. The content of both those patent applications are including herewith by way of cross-reference.

As best illustrate in FIG. 1, the housing includes three peripheral edges 28, 29 and 30, where edge 30 defines a fold line of laminate 3. The heat sealing occurs across the shaded area designated by the reference numeral 31 that extends along all of edges 28 and 29 and a small portion of edge 30. As the abutted layers in area 31 are like layers 4, it is a reasonably simple operation to affect the heat sealing. Particularly, as the abutted laminate is of substantially uniform collective thickness over all of area 31 there are no complications arising from contour changes. This is a significant advantage over prior art arrangements.

In other embodiments, laminate 3 includes two separate sheets having respective peripheries that are abutted to the other and sealed together.

The housing includes a plurality of spaced apart openings 7. While FIG. 2 illustrates one pair of those openings, it is usual for housing to accommodate a like terminal (not shown) that similarly extends across to another like pair of opposed openings 7. Cross-reference is again made to the above mentioned patent applications. In some housings there are a greater number of terminals and corresponding pairs of openings.

Terminal 2 extends from openings 7 to a distal end (not shown) that is connected to the energy storage cell. While in this embodiment that cell is a supercapacitive cell, in other embodiments it is a fuel cell, a capacitive cell or an electrochemical cell.

Surfaces 25 and 26 provide respective sites for the heat sealing of laminate 3 to terminal 2. More particularly, heat is applied to the cross hatched area in FIG. 1 designated by the reference numeral 36. This area surrounds openings 7 and results in a seal being formed between terminal 2 and laminate 3. This seal extends along all of edge 6. Importantly, area 36 does not extend beyond respective surfaces 25 and 26.

As surfaces 25 and 26 are substantially planar, the collective thickness of the material to which the heat is applied is relatively uniform over the entirety of area 36. This facilitates a better seal between terminal 2 and laminate 3 and also makes the process of affecting the seal more robust and easier to apply in a manufacturing environment. That is, laminate 3 is not contoured in the region immediately adjacent to the seal and is therefore less susceptible to imperfections in the sealing process.

The thickness of layer 10 in this embodiment is greater than the combined thickness of layers 5, 13 and 14 to ensure there is sufficient material to adequately form grommet 8. In other embodiments layer 10 is of a lesser thickness but, in any event, it must be of sufficient thickness to provide for the formation of the grommet.

In further embodiments, layer 10 is of a reduced thickness, although the combined thickness of layers 4 and 10 is greater than the combined thickness of layers 5, 13 and 14.

In the embodiment illustrated, the nominal thickness of layers 4, 5, 10, 13 and 14 is 20 microns, 20 microns, 60 microns, 20 microns and 20 microns and this is found to provide for adequate performance of the housing during the lifetime of the device as well as being sufficiently tolerant to manufacturing vagaries. It will be appreciated that these thicknesses of the layers are for the laminate prior to heat sealing. Those areas of the laminate that are subject to the heat and pressure of the heat sealing operation are reduced in thickness due to the preferential softening and subsequent flow of particularly layers 4 and 10. This is illustrated in FIG. 2 and FIG. 3 where laminate 3 is clearly shown as being "flattened" in areas 31 and 36.

In alternative embodiments different laminates are used which include layers of different thickness.

For the purposes of comparison, the thickness of terminal 2 is about 150 microns. In other embodiments different terminal thicknesses are used and the usual range is between about 100 microns and 300 microns.

Figure 4:
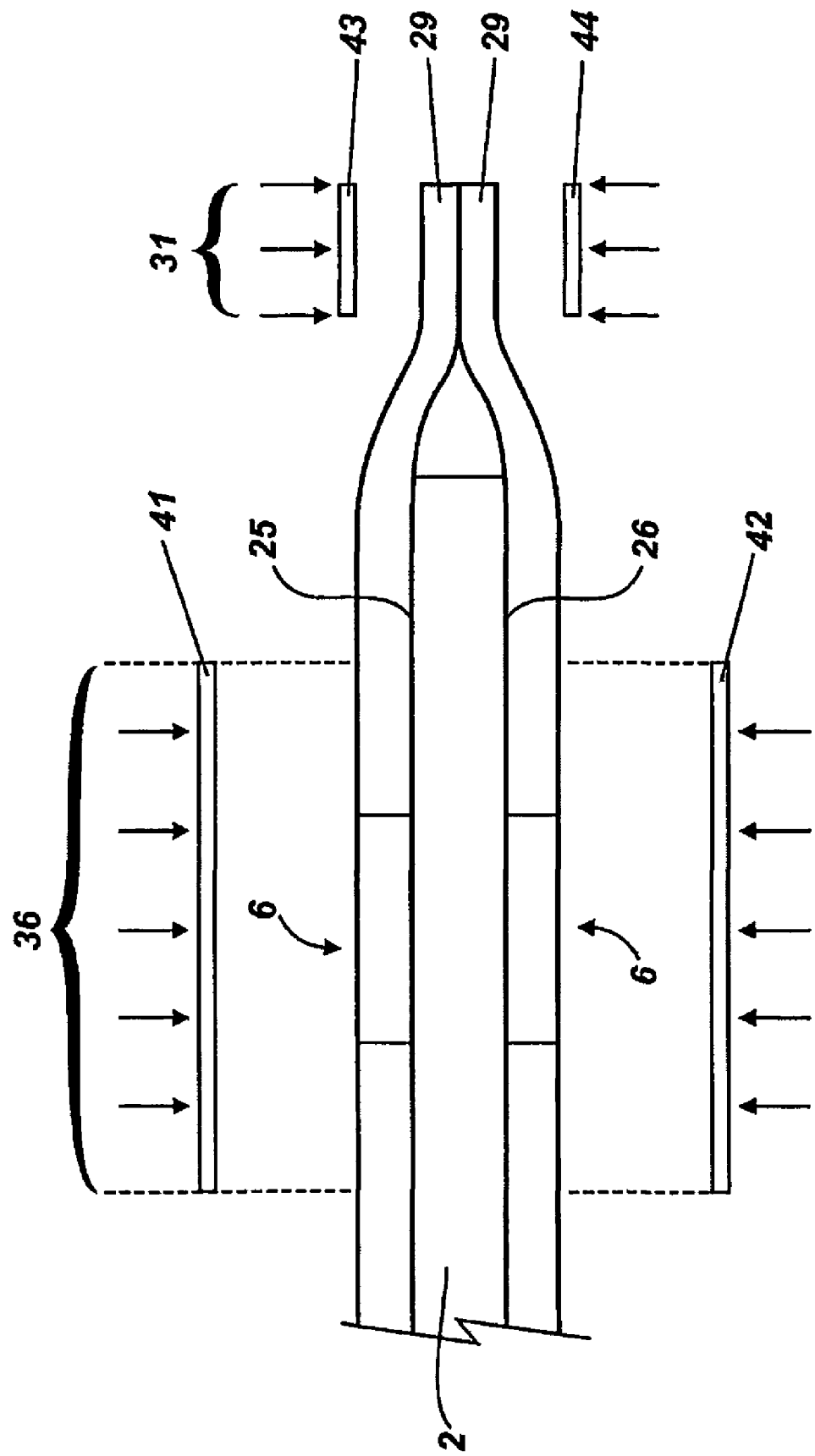
FIG. 4 is a cross sectional view similar to FIG. 2 but prior to the heat sealing.

Reference is now made to FIG. 4 which illustrates one of the steps of forming connection 1. As shown, laminate 3 is folded about terminal 2 so that openings 7 overlie each other and respective surfaces 25 and 26. That is, edges 6 are generally aligned with each other. Also, edges 29 are progressed into abutment. The next step is the application of compressive forces and heat simultaneously to areas 31 and 36. This is achieved by a forming station that includes at least four heat and pressure plates 41, 42, 43 and 44. That is, plates 41 and 42 are opposed and progressed toward each other to form the heat seal in area 36, while plates 43 and 44 are opposed and progressed toward each other to form the heat seal in area 31. To facilitate the sealing operation, some embodiments also include an additional heat applicator that is connected to the distal end of terminal 2. This ensures that laminate 3 is heated both from the inside and the outside. In some embodiment the applicator is an induction heater. Other applicators utilize Peltier effect elements.

Due to the relative softening and melting points of the layers in laminate 3, the application of the heat and compression results in a preferential softening and flow of layers 4 and 10, and particularly the latter. Accordingly, in area 36, laminate 3 narrows, predominantly as a result of a corresponding narrowing of layer 10. That is, some of layers 4 and 10 flow into opening 7 and across edge 6 to form grommet 8.

For the benefit of the reader, the melting point of PET is about 265° C. and the melting point of PE and Nucrel polymer is about 130° C. This spread of melting points for the respective materials has been found to form grommet 8 such that is provides an effective insulating barrier between electrode 2 and layer 5. In other embodiments alternative materials are used with a similar spread of melting points. In still further embodiments, however, use is made of localized heating to achieve the preferential softening of the second layer.

The compressive force is maintained until the spacing between plates 41 and 42 is reduced to a predetermined distance. This ensures that layers 4 and 10 will not be overly narrowed in area 36. In any event, as the melting point of layer 14 is significantly higher than that of layers 4 and 10, even if all of the latter layers were to be depleted in some of area 36 this should not result in any contact of layer 5 with terminal 2.

As this process allows significantly more compression to be applied without unnecessarily increasing the risk of electrical shorting between the terminal and layer 5, it is possible to achieve a superior bonding and sealing between the disparate materials of the terminal and laminate.

Once the heat is removed, by retracting plates 41, 42, 43 and 44 out of engagement with laminate 3, the laminate and the terminal cool and the grommets set into the form shown in FIG. 1.

The process of forming the connection is very robust and offers a considerable safety margin to accommodate the usual manufacturing variations that arise.

As intimated above, plates 43 and 44 are also progressed toward each other to effect heat sealing of the laminate to itself in area 31. However, the compressive forces applied to these plates is less than that between plates 41 and 42. That is, it is considerably easier to form a heat seal between the adjacent layers 4 as the formation of a grommet is not required. In some embodiments, however, plates 43 and 44 are progressed toward each other similarly to plates 41 and 42 to effect the formation of a grommet about edges 28 and 29.

To ensure good conductivity between the energy storage cell and any external circuitry it is desirable to ensure that terminal 2 is as thick as possible. With prior art systems this resulted in an inherent compromise, as the thicker the terminal was made, the greater the contour that was produced in the laminate and therefore the greater the problems of adequately sealing the two together. The present embodiment, however, obviates all these difficulties and compromises by ensuring that each heat sealed is effected over an area that is planar and that includes a substantially uniform thickness of materials.

To electrically connect the cell to external circuitry a contact or wire is welded—ultrasonically or otherwise—or soldered to one or both of surfaces 25 and 26. This welding or soldering occurs at that portion of those surfaces that remain exposed through respective openings 7. Accordingly, the grommet also provides a barrier to shorting between that contact or wire and layer 5.

In some embodiments, surface 25 is electrically connected directly to a surface 26 of a like energy storage device.

In areas 31 and 36 the thickness of laminate 3 is reduced due to the combination of heat, compression and the softening and flow of layers 4 and 10.

The function of layer 4 is to improve the bonding between terminal 2 and laminate 3. It also functions to keep the electrolyte within the subsequently formed housing from contacting grommet 8 in the region that that grommet abuts and seals against the surface of terminal 2.

The function of layer 10 is to soften upon application of heat so that it flows to form grommet 8. This softening occurs well prior to the softening of layers 13 and 14 but approximately simultaneously with the softening of layer 4. It will be understood by those skilled in the art that aluminium layer 5 will remain essentially unaffected by the temperatures that will cause softening of the other layers. Layer 10 in this embodiment is sufficiently thick and of a sufficiently low melting point that the resultant grommet 8 extends radially inwardly beyond the extent of layer 4 and into sealing abutment with terminal 2. This protects and shields layer 4 from the environment and, in particular, from oxygen that can contaminate and quickly degrade this layer.

The function of layer 14 is to provide a non-conductive flexible layer between layer 5 and layer 10. Layer 14, being of PET, has a high melting point relative to layers 4 and 10 and therefore will reduce the risk of layer 5 being shorted to terminal 2 during the application of heat to connection 1 by automated equipment. That is, even if all of layers 4 and 10 flow from beneath portions of layer 14, such that those portions are abutted with surface 25, there will not be any electrical engagement between layer 5 and terminal 2. That is, the inclusion of layer 14 reduces the failure rate of laminate 3 in automated heat sealing processes.

Layer 5 functions as a barrier layer and is intended to prevent the ingress of contaminants into the housing and the egress of electrolyte from the housing. Materials other than aluminium are available.

The function of layer 13 is to provide a non-conductive outer protective layer to the energy storage device. It also has to have a relatively high melting point relative to that of layers 4 and 10. That is, while layer 13 can tolerate some softening and flow, it is strongly preferred that most if not all of that flow be limited to layers 4 and 10. In some embodiments layer 13 is corona treated so that it provides a substrate suitable for bearing printed information.

Figure 5:
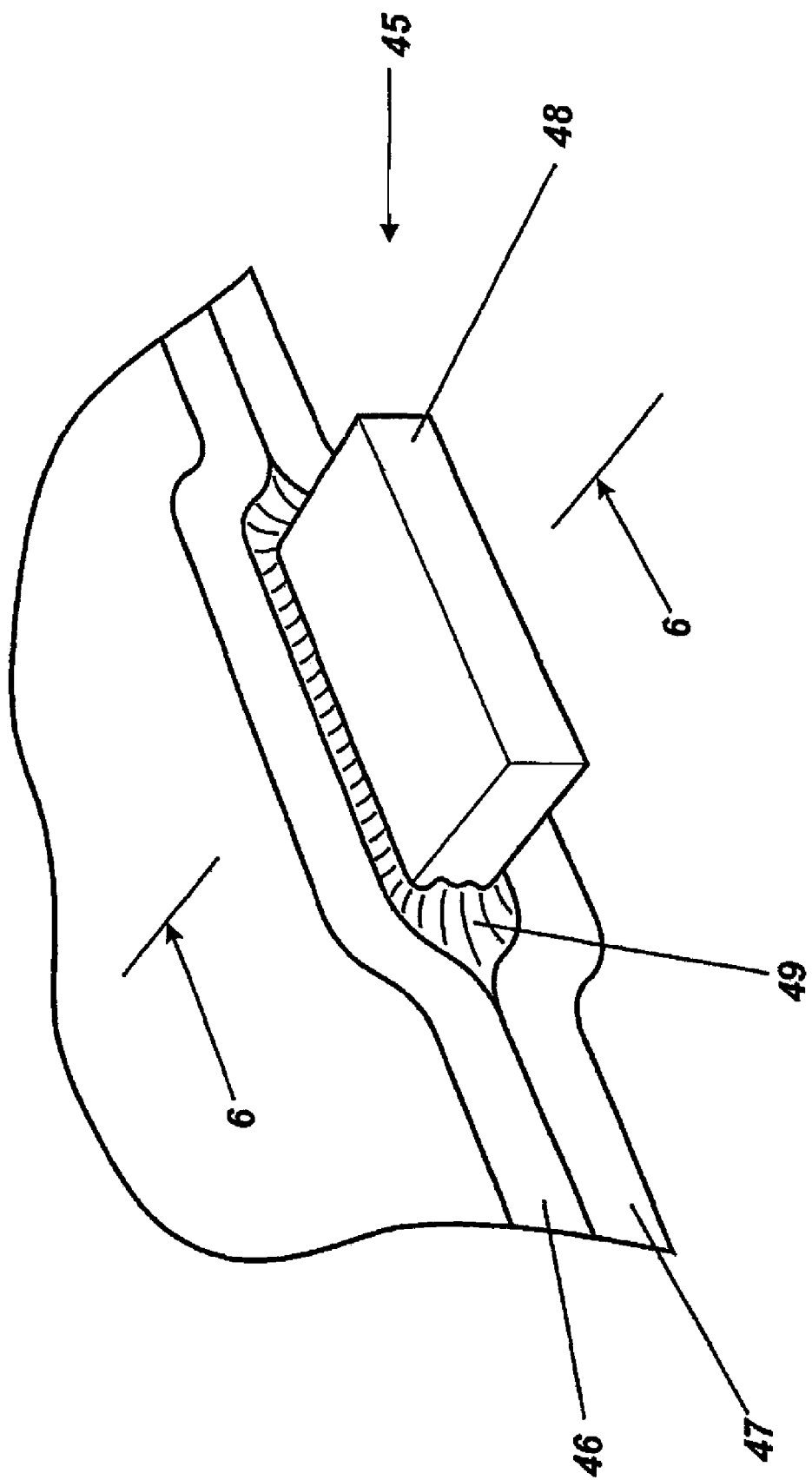
FIG. 5 is a perspective view of a portion of an alternative embodiment of the invention.
Figure 6:
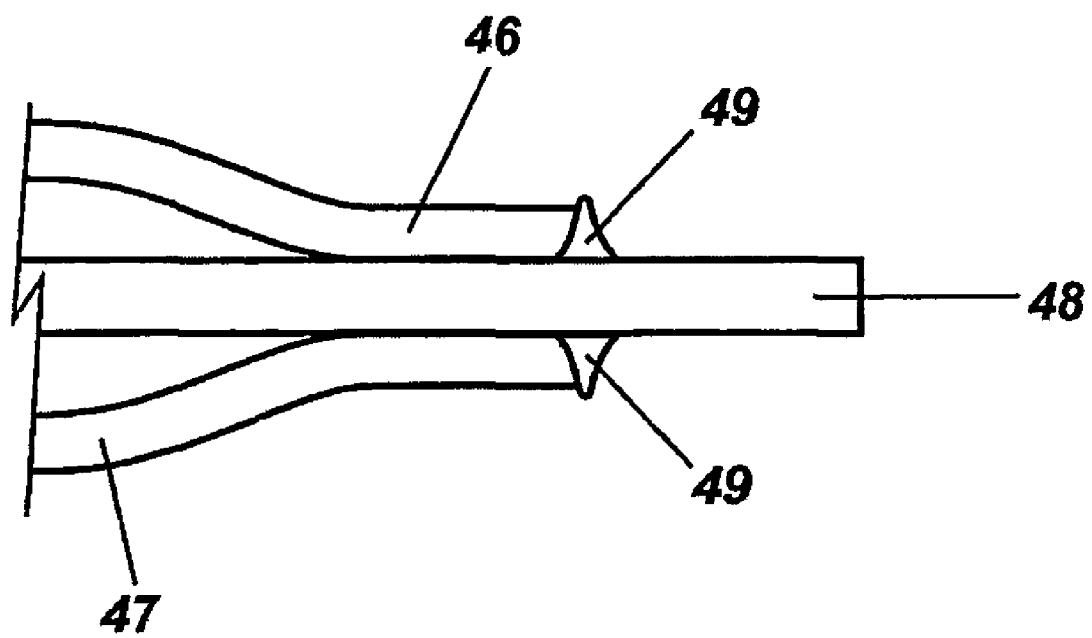
FIG. 6 is a cross sectional view taken along line 6-6 of FIG. 5.

Other embodiments of connection 1 are also suitable to energy storage devices that utilize the prior art configuration of the electrodes extending outwardly from between two laminate sheets. For example, as shown in FIG. 5, a supercapacitor 45 includes two like laminate sheets 46 and 47 that are opposed and which sandwich an energy storage cell (not shown). A terminal 48 extends outwardly from the cell and from between the common abutted edges of sheets 46 and 47. There is a contour in the laminate sheets due to the terminal. However, as a grommet 49 is formed to extend across the otherwise exposed common edges of sheets 46 and 47, the risk of shorting between the terminal and the conductive layer in the sheets is considerably reduced if not eliminated. Accordingly, as with the other embodiments described above, this preferred embodiment is also far more suited to automated manufacture and repeatability of manufacture than known devices. That is, the same inbuilt protection is provided against shorting of conductive elements during the manufacturing process.

Leading up to the connection between the laminate and the terminal, regardless of whether that is for the FIG. 1 or the FIG. 5 embodiment, the laminate is cut or otherwise trimmed to form the common edge 6. For the FIG. 1 example, the common edge 6 is formed by a punching operation that creates openings 7. For the FIG. 5 example, the straight common edge is formed by a cutting operation. However, in other embodiments the laminate is subject to a shearing operation.

Figure 7:
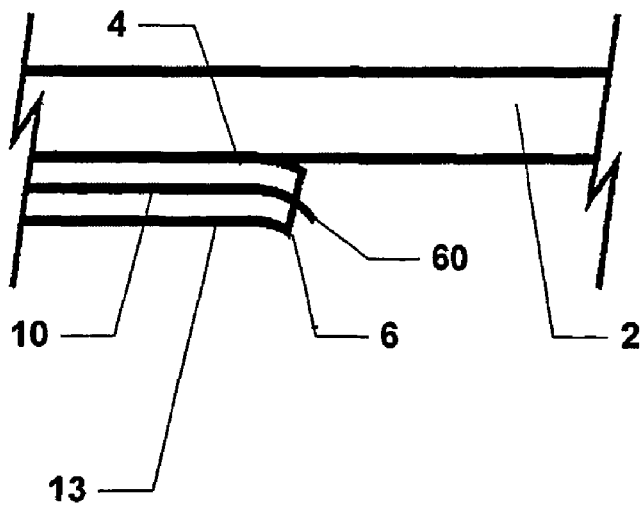
FIGS. 7(a) and 7(b) are respective schematic cross sectional views of a preferred and a non-preferred placement of a pre-cut laminate on a terminal.
Figure 7:
Figure 7:
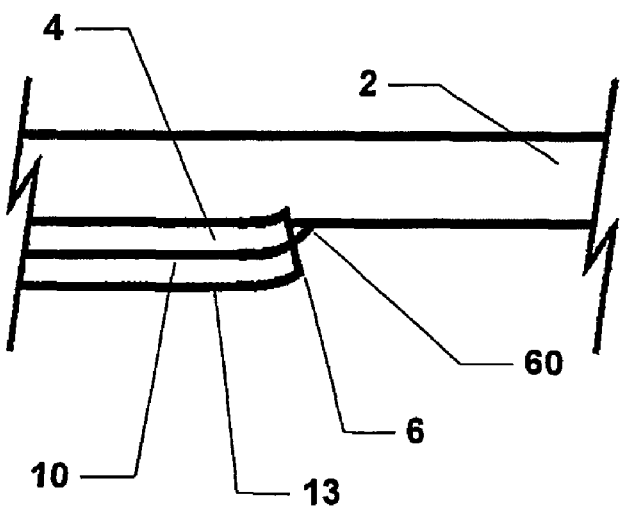
Figure 7:
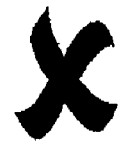

Regardless of the method used to size the laminate, it has been found that the common edge of the laminate is often deformed, in that the edge is no longer normal to the notional plane of the laminate. Moreover, given the greater tensile and shear strength of metal layer 5 and the significant differences in the ductility of layer 5 and the other layers, it has been found that layer 5 is often deformed or otherwise elongated beyond the common edge provided by the other layers. A schematic representation of two laminates that have been cut to size and which have undergone the deformation referred to above is illustrated in FIGS. 7(a) and (b). That is, the common edge 6 is deflected from the notional plane of the laminate, and layer 5 extends beyond edge 6 of the surrounding layers 4 and 13 to an edge 60.

The deformation of layer 5 could be inherent in the cutting operation used or could be a result of worm cutting equipment. Either way, there is a danger that the edge 60 of layer 5 will contact terminal 2 and create a short In some cases where this short does occur, it is removed during the subsequent formation of grommet 8. Notwithstanding, it is still preferred that the laminate is abutted against terminal 2 as shown in FIG. 7(a). That is, if it is understood that the sizing operation of the laminate will create the deformation referred to above, then that operation is performed such that layer 13 is concave adjacent to edge 6 and layer 4 is convex adjacent to edge 6. This has the effect of ensuring that edges 6 and 60 being spaced apart and inclined away from terminal 2.

In some embodiments the sizing of the laminate is chosen to purposely introduce the deformation shown in FIG. 7(a).

Although the invention has been described with reference to specific examples it will be appreciated by those skilled in the art that it may be embodied in many other forms.

The invention claimed is:

1. A connection assembly including:
   a conductive substrate;
   a laminate having:
      a polymer layer that is secured to the substrate, the polymer layer having adhesive properties;
      a conductive layer disposed adjacent to the polymer layer and being spaced apart from the substrate wherein the polymer layer and the conductive layer both terminate at a common edge that overlies the substrate; and
      an inner plastics layer intermediate to the conductive layer and the polymer layer, wherein the inner plastics layer has a high melting point relative to the polymer layer for reducing the risk of the conductive layer being shorted to the substrate; and
   an insulator in the form of a grommet that is integrally formed from the polymer layer and which extends over the common edge for electrically insulating the conductive layer from the substrate.

2. The connection assembly according to claim 1 wherein the common edge is defined by the periphery of an opening that extends through the layers.

3. The connection assembly according to claim 1 wherein the polymer layer has a melting point of about 130 degrees Celsius and having adhesive properties.

4. The connection assembly according to claim 1 wherein the laminate further includes an outer plastics layer such that the inner and outer plastics layers sandwich the conductive layer.

5. The connection according to claim 4 wherein the laminate includes a sealant layer intermediate the polymer and the substrate.

6. The connection assembly according to claim 1 wherein the common edge is a portion of a straight edge of the laminate that passes over the substrate.

7. The connection assembly according to claim 1 wherein all the layers in the laminate are coextensive and coterminous.

8. The connection assembly according to claim 4 wherein the thickness of the polymer layer is greater than or equal to the combined thickness of the inner plastics, outer plastics and conductive layers.

9. The connection assembly according to claim 1 wherein all of the common edge overlies the substrate.

10. The connection assembly according to claim 4 wherein the inner plastics layer has a high melting point relative to the polymer layer for reducing the risk of the conductive layer being shorted to the substrate.

11. The connection assembly according to claim 4 wherein the outer plastics layer is formed from a non-conductive material and has a high melting point relative to the polymer layer.

12. A connection assembly including:
a conductive substrate;
a laminate having:
    a first polymer layer that is secured to the substrate;
    a conductive layer disposed adjacent to the polymer layer and being spaced apart from the substrate wherein the polymer layer and the conductive layer both terminate at a common edge that overlies the substrate; and
    an inner plastics layer intermediate the conductive layer and the polymer layer; and
an insulator in the form of a grommet that is integrally formed from the inner plastics layer and which extends over the edge for electrically insulating the conductive layer from the substrate.

13. A laminate for connecting a conductive substrate, the laminate including:
a plurality of layers that terminate at a common edge for overlying the substrate, the layers having at least:
    a polymer layer secured to the substrate; and
    a conductive layer disposed adjacent to the polymer layer and being spaced apart from the substrate;
    an inner plastics layer intermediate the conductive layer and the polymer layer; and
    an insulator in the form of a grommet that is integrally formed from at least one of the polymer layer, conductive layer and inner plastics layer and extends over the edge for electrically insulating the conductive layer from the substrate.

14. A connection assembly including:
a conductive substrate; and
a laminate having:
    a polymer layer that is secured to the substrate; and
    a conductive layer disposed adjacent to the polymer layer and being spaced apart from the substrate; and
    an insulator in the form of a grommet that is integrally formed from the laminate and which extends over the edge for electrically insulating the conductive layer from the substrate.

15. A connection assembly including:
a conductive substrate; and
a laminate having:
    a first polymer layer that is secured to the substrate;
    a conductive layer disposed adjacent to the first polymer layer and being spaced apart from the substrate wherein the first polymer layer and the conductive layer both terminate at a common edge that overlies the substrate; and
    a second polymer layer disposed adjacent to the first polymer layer and being spaced apart from the substrate; and
    an insulator in the form of a grommet that extends over the edge from the second polymer layer for electrically insulating the conductive layer from the substrate.

16. The connection assembly according to claim 13 wherein the second polymer layer is intermediate the conductive layer and the first polymer layer.

17. The connection assembly according to claim 13 wherein the insulator is integrally formed from the second polymer layer.

18. A method for providing a connection between a conductive substrate and a laminate, the method including:
providing a laminate including:
    a conductive layer;
    a polymer layer having adhesive properties;
    a polyethylene terephthalate (PET) layer intermediate the conductive layer and the polymer layer, the PET layer having a high melting point relative to the polymer layer;
positioning the laminate on the substrate such that the conductive layer overlies and is spaced apart from the substrate by the PET layer and the polymer layer, the polymer layer being intermediate the conductive layer and the substrate, such that the conductive layer, the polymer layer and the PET layer all terminate at a common edge that overlies the substrate and defines the periphery of a circular opening that overlies the substrate for allowing external electrical connection to the substrate;
applying heat and pressure to the laminate such that:
    the polymer layer is secured to the substrate;
    the PET layer is secured to the polymer layer;
    the conductive layer is secured to the PET layer;
    the polymer layer softens and flows to integrally form an insulator in the form of a grommet that extends over the common edge for electrically insulating the conductive layer from the substrate, such that the grommet defines the periphery of the circular opening that overlies the substrate; and
wherein the relatively higher melting point of the PET reduces the likelihood of the conductive layer being shorted to the substrate upon the softening and flowing of the polymer layer.

19. The connection assembly according to claim 4 wherein the inner plastic layer, outer plastics layer and conductive layer respectively include polyethylene terephthalate (PET), polyethylene terephthalate (PET) and aluminum.

20. The connection assembly according to claim 1 wherein only part of the common edge overlies the substrate.

* * * * *

UNITED STATES PATENT AND TRADEMARK OFFICE
CERTIFICATE OF CORRECTION

PATENT NO. : 7,595,131 B2  Page 1 of 1
APPLICATION NO. : 10/433860
DATED : September 29, 2009
INVENTOR(S) : James et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1377 days.

Signed and Sealed this

Twenty-eighth Day of September, 2010

David J. Kappos
*Director of the United States Patent and Trademark Office*